United States Patent
Imamura

(10) Patent No.: US 10,628,718 B2
(45) Date of Patent: Apr. 21, 2020

(54) IMAGE FORMING APPARATUS, CONTROL METHOD FOR THE IMAGE FORMING APPARATUS, AND STORAGE MEDIUM FOR CONTROLLING A POWER STATE BASED ON TEMPERATURE

(71) Applicant: CANON KABUSHIKI KAISHA, Tokyo (JP)

(72) Inventor: Takeru Imamura, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/671,896

(22) Filed: Mar. 27, 2015

(65) Prior Publication Data

US 2015/0278665 A1    Oct. 1, 2015

(30) Foreign Application Priority Data

Apr. 1, 2014   (JP) .................. 2014-075110

(51) Int. Cl.
*G03G 15/00* (2006.01)
*G03G 21/20* (2006.01)
(Continued)

(52) U.S. Cl.
CPC ..... *G06K 15/4055* (2013.01); *G03G 15/5004* (2013.01); *G03G 15/80* (2013.01);
(Continued)

(58) Field of Classification Search
CPC .. G06K 15/408; G06K 15/4055; G06K 9/468; G06K 9/52; G06K 9/00221;
(Continued)

(56) References Cited

U.S. PATENT DOCUMENTS 8,036,556 B2 * 10/2011 Kinouchi ........... G03G 15/5004
399/69
9,116,484 B2 * 8/2015 Masumoto ......... G03G 15/5004
(Continued)

FOREIGN PATENT DOCUMENTS

CN    102854765 A    1/2013
CN    103415788 A    11/2013
(Continued)

OTHER PUBLICATIONS

English Machine Translation of JP 2013-020048-A (Ogata, Published Jan. 31, 2013).*

*Primary Examiner* — Juan M Guillermety
(74) *Attorney, Agent, or Firm* — Canon U.S.A., Inc. IP Division

(57) ABSTRACT

An image forming apparatus includes a temperature sensor, a holding unit that holds background temperature data that is obtained by the temperature sensor and indicates a temperature state in a surrounding of the image forming apparatus, an obtaining unit that obtains plural pieces of data generated by performing a calibration with respect to each of plural pieces of temperature data obtained by the temperature sensor after the background temperature data is held by the holding unit by using the background temperature data held by the holding unit, and a control unit that controls return of a state of the image forming apparatus from a power saving state based on the plural pieces of data obtained by the obtaining unit.

12 Claims, 7 Drawing Sheets

(51) Int. Cl.
  *H04N 1/00*   (2006.01)
  *G06F 3/12*   (2006.01)
  *G06K 15/00*  (2006.01)

(52) U.S. Cl.
  CPC ............... *G03G 21/20* (2013.01); *G06F 3/12* (2013.01); *H04N 1/00* (2013.01)

(58) Field of Classification Search
  CPC .......... G06K 9/00436; G06K 9/00362; G03G 15/5004; G03G 15/80; G03G 21/20; G03G 2215/1685; G03G 15/2003; G06F 1/3215; G06F 1/3206; G06F 1/3231; H04N 1/00896; H04N 1/00891; H04N 5/23219; H04N 21/42201; H04N 21/42202; H04N 21/42218; H01H 2239/07; G01R 19/225
  USPC ..................................... 358/1.14, 1.12, 1.13
  See application file for complete search history.

(56) References Cited

U.S. PATENT DOCUMENTS

| | | | | |
|---|---|---|---|---|
| 2008/0284712 | A1* | 11/2008 | Muto | G09G 3/3651 345/101 |
| 2011/0296217 | A1* | 12/2011 | Nishimura | G06F 1/3215 713/323 |
| 2011/0298597 | A1* | 12/2011 | Kaihori | G08C 17/02 340/13.25 |
| 2012/0140295 | A1* | 6/2012 | Hirata | H04N 1/00896 358/475 |
| 2012/0159223 | A1* | 6/2012 | Furubayashi | G06K 15/4055 713/323 |
| 2013/0010335 | A1* | 1/2013 | Baba | H04N 1/00896 358/1.15 |
| 2013/0250372 | A1* | 9/2013 | Ogata | G03G 15/5004 358/442 |
| 2014/0063528 | A1* | 3/2014 | Hirose | H04N 1/00891 358/1.13 |
| 2014/0092401 | A1* | 4/2014 | Nakayama | H04N 1/00408 358/1.5 |
| 2014/0098394 | A1* | 4/2014 | Tanisaki | G01J 5/0022 358/1.13 |
| 2014/0153013 | A1* | 6/2014 | Imamura | H04N 1/00037 358/1.12 |
| 2014/0153020 | A1* | 6/2014 | Tachikawa | G06K 15/4055 358/1.13 |
| 2014/0157032 | A1* | 6/2014 | Yokoyama | G06F 1/3215 713/323 |
| 2014/0160505 | A1* | 6/2014 | Tachikawa | H04N 1/00891 358/1.13 |
| 2014/0253938 | A1* | 9/2014 | Aoyagi | G06K 15/4055 358/1.13 |
| 2015/0003743 | A1* | 1/2015 | Nosaka | G06T 7/136 382/203 |

FOREIGN PATENT DOCUMENTS

| | | |
|---|---|---|
| CN | 103676532 A | 3/2014 |
| JP | H06-043025 A | 2/1994 |
| JP | 2006198819 A | 8/2006 |
| JP | 2008228269 A | 9/2008 |
| JP | 2012-058645 A | 3/2012 |
| JP | 2012-194121 A | 10/2012 |
| JP | 2013-020048 A | 1/2013 |
| JP | 2013190701 A | 9/2013 |

* cited by examiner

IMAGE FORMING APPARATUS, CONTROL METHOD FOR THE IMAGE FORMING APPARATUS, AND STORAGE MEDIUM FOR CONTROLLING A POWER STATE BASED ON TEMPERATURE

BACKGROUND

Field

Aspects of the present invention generally relate to an image forming apparatus, a control method for the image forming apparatus, and a storage medium.

Description of the Related Art

An image forming apparatus provided with a human presence sensor configured to detect a human presence has been proposed (see Japanese Patent Laid-Open No. 2012-58645). The human presence sensor provided to the image forming apparatus determines whether or not a person approaches the image forming apparatus, and a mode of the image forming apparatus is returned from a power saving mode to a standby mode on the basis of the determination. The mode of the image forming apparatus is returned to the standby mode before the person reaches a location in front of the image forming apparatus, and a user can operate the image forming apparatus without waiting in front of the image forming apparatus.

Japanese Patent Laid-Open No. 2012-58645 discloses an example in which a temperature sensor configured to detect heat from a person is used as the human presence sensor. However, Japanese Patent Laid-Open No. 2012-58645 does not mention at all that this temperature sensor is affected by an influence of a temperature in a surrounding of the image forming apparatus (for example, solar light coming in through a gap in curtains, a fluorescent lamp, a power supply of an electronic device such as a personal computer (PC), or the like).

However, the temperature sensor disclosed in Japanese Patent Laid-Open No. 2012-58645 is affected by the influence of the heat such as the solar light, the fluorescent lamp, and the like and erroneously returns the mode of the image forming apparatus to the standby mode.

SUMMARY

Aspects of the present invention are generally directed to accurately detecting an approach by a person to an image forming apparatus without an erroneous detection caused by a temperature in a surrounding of the image forming apparatus.

According to an aspect of the present invention, an image forming apparatus includes a temperature sensor, a holding unit that holds background temperature data that is obtained by the temperature sensor and indicates a temperature state in a surrounding of the image forming apparatus, an obtaining unit that obtains plural pieces of data generated by performing a calibration with respect to each of plural pieces of temperature data obtained by the temperature sensor after the background temperature data is held by the holding unit by using the background temperature data held by the holding unit, and a control unit that controls return of a state of the image forming apparatus from a power saving state based on the plural pieces of data obtained by the obtaining unit.

Further features of the present invention will become apparent from the following description of exemplary embodiments with reference to the attached drawings.

DESCRIPTION OF THE EMBODIMENTS

Exemplary embodiments will be described below with reference to the drawings.

Descriptions on System Configuration

First Exemplary Embodiment

Figure 1A:
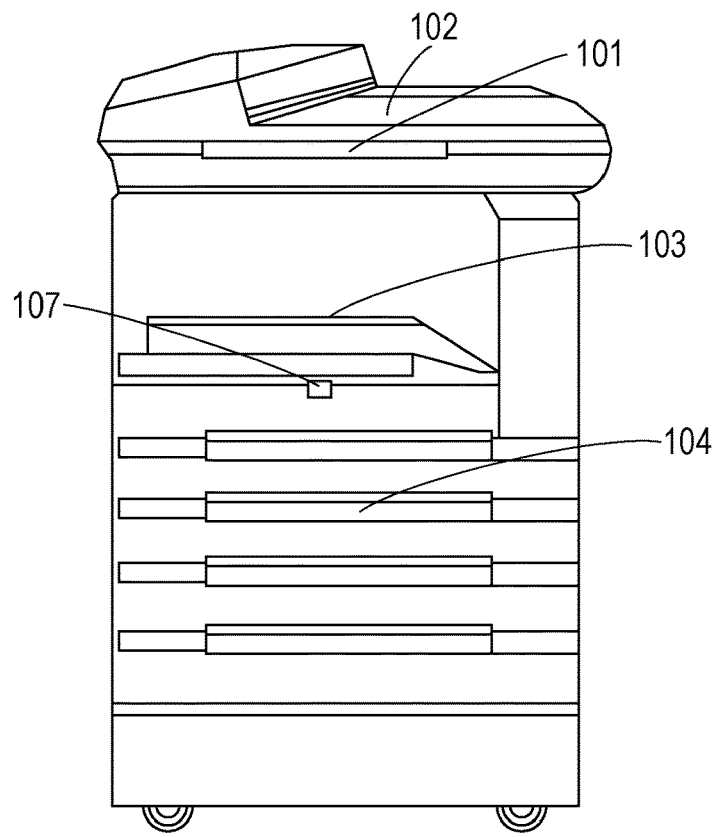
FIGS. 1A and 1B are overall views of an image forming apparatus.
Figure 1B:
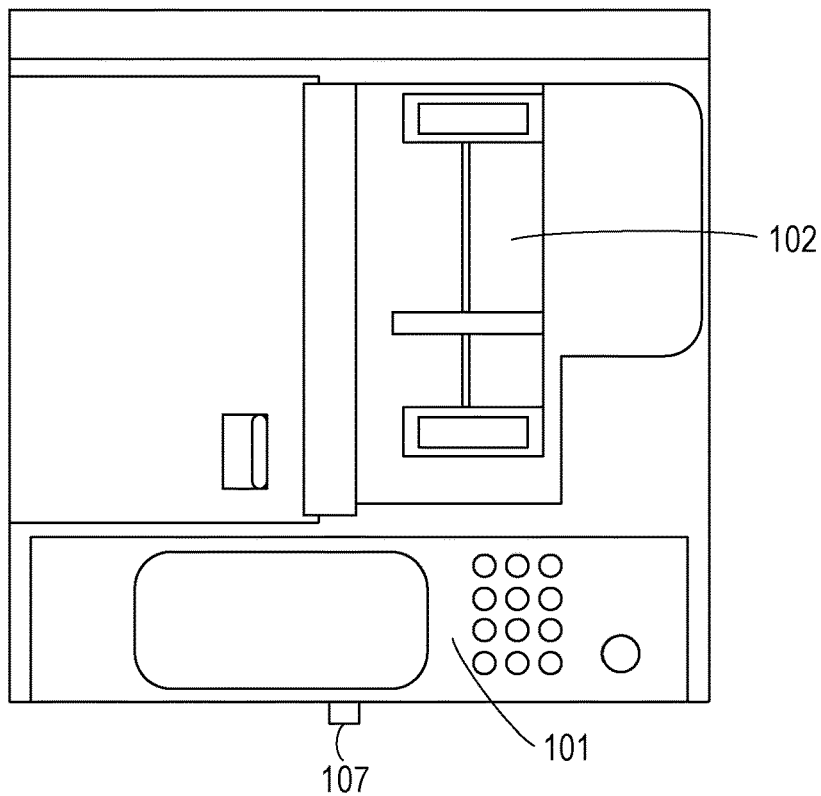

FIGS. 1A and 1B are overall views of an image forming apparatus 100 according to the present exemplary embodiment. FIG. 1A is a front view of the image forming apparatus. FIG. 1B is a plan view of the image forming apparatus. Herein, the image forming apparatus includes a multifunctional apparatus having a plurality of functions (a printing function, a scanner function, a copying function, a facsimile (FAX) function, and the like), a facsimile apparatus, and a scanner apparatus. Although not particularly illustrated in the drawings, according to the present exemplary embodiment, the image forming apparatus is installed under an environment where heat sources such as a personal computer, an illumination, and a heater are arranged in a surrounding of the image forming apparatus.

In FIGS. 1A and 1B, the image forming apparatus 100 is constituted by an operation unit 101, a scanner 102, an internal finisher 103, a feeding cassette 104, and the like. The image forming apparatus 100 according to the present exemplary embodiment has the functions of copying, printing, FAX, scanning, and the like.

The image forming apparatus 100 is put into a standby mode (first power state) and a power saving mode (second power state) in which power consumption is lower than power consumption in the standby mode. The standby mode corresponds to a state in which the respective functions of copying, printing, FAX, scanning, and the like can be executed. The power saving mode corresponds to a state in which the mode of the image forming apparatus 100 can be shifted to the standby mode in a case where a returning factor is detected. In the power saving mode, power is supplied to a component where the returning factor (such as a press of a power saving key 214, a reception of an uprising request packet from an external apparatus, or a detection of a person by the temperature sensor) is to be detected, and power is not supplied to a function unit (a printer 216 or the scanner 102) that executes the above-described functions. As illustrated in FIGS. 1A and 1B, a temperature sensor 107 is provided in front of the image forming apparatus 100. The temperature sensor 107 operates in the power saving mode.

Figure 2:
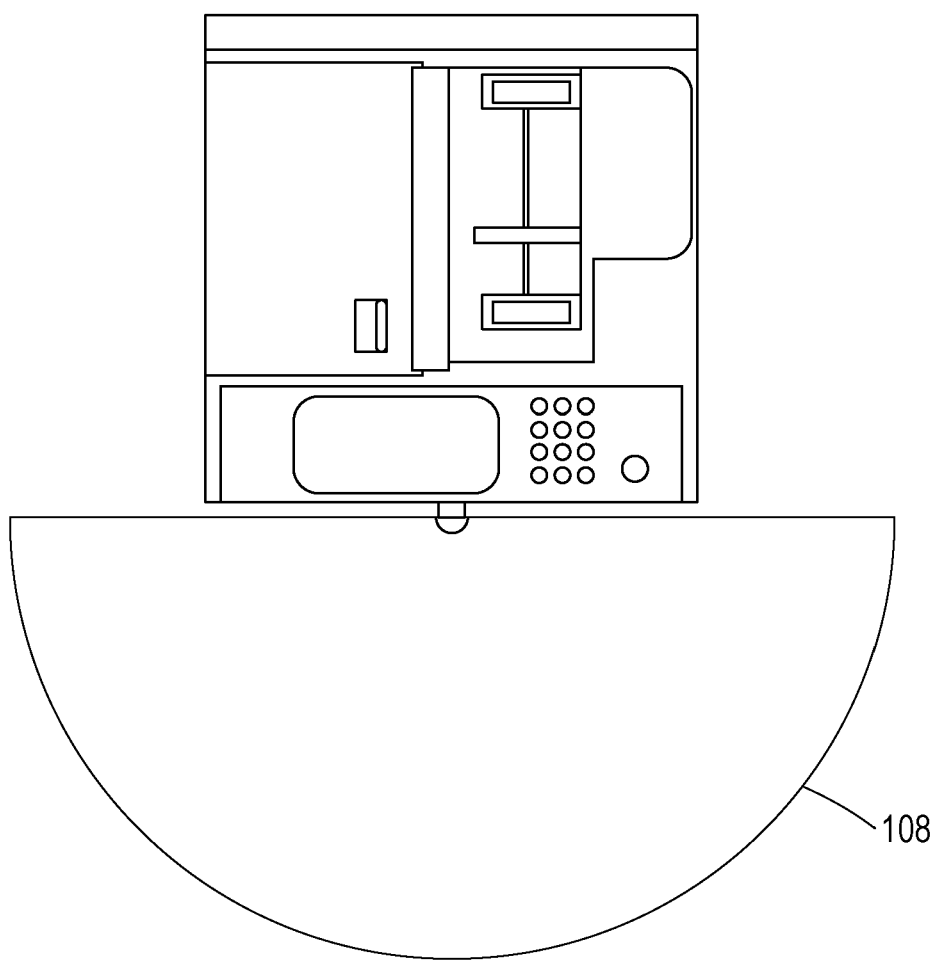
FIG. 2 illustrates a detection range of a temperature sensor.

FIG. 2 illustrates an example of a detection range of the temperature sensor 107 illustrated in FIGS. 1A and 1B.

The temperature sensor 107 according to the present exemplary embodiment is an infrared array sensor (infrared ray reception sensor) in which elements configured to receive infrared rays are arranged in a grid like fashion. This infrared array sensor may be an active type sensor (infrared ray transmission and reception sensor) that emits infrared rays and receives reflections of the infrared rays or may be a passive type sensor that receives infrared rays radiated from a person or the like. The temperature sensor 107 according to the present exemplary embodiment is of the active type. The temperature sensor 107 is arranged to face obliquely upward so as not to detect a heat source on a floor or a desk. Therefore, in a case where the person or the like approaches the image forming apparatus 100 from a remote place of the image forming apparatus 100, the heat is detected from the elements on a lower side of the temperature sensor 107. It is noted that the infrared sensor may be of a type in which the elements are linearly arranged.

Figure 3A:
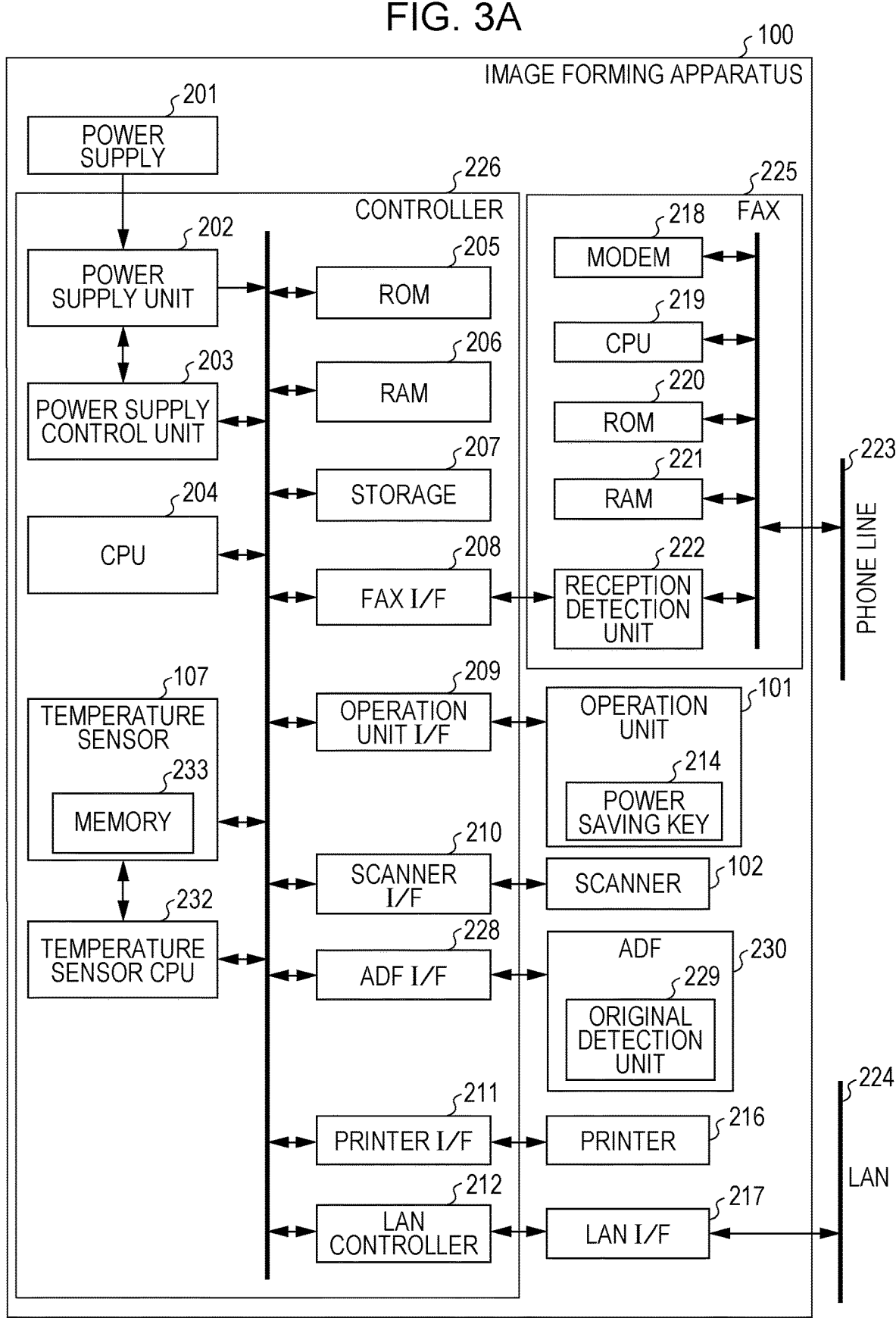
FIGS. 3A and 3B are block diagrams illustrating a hardware configuration of the image forming apparatus.
Figure 3B:
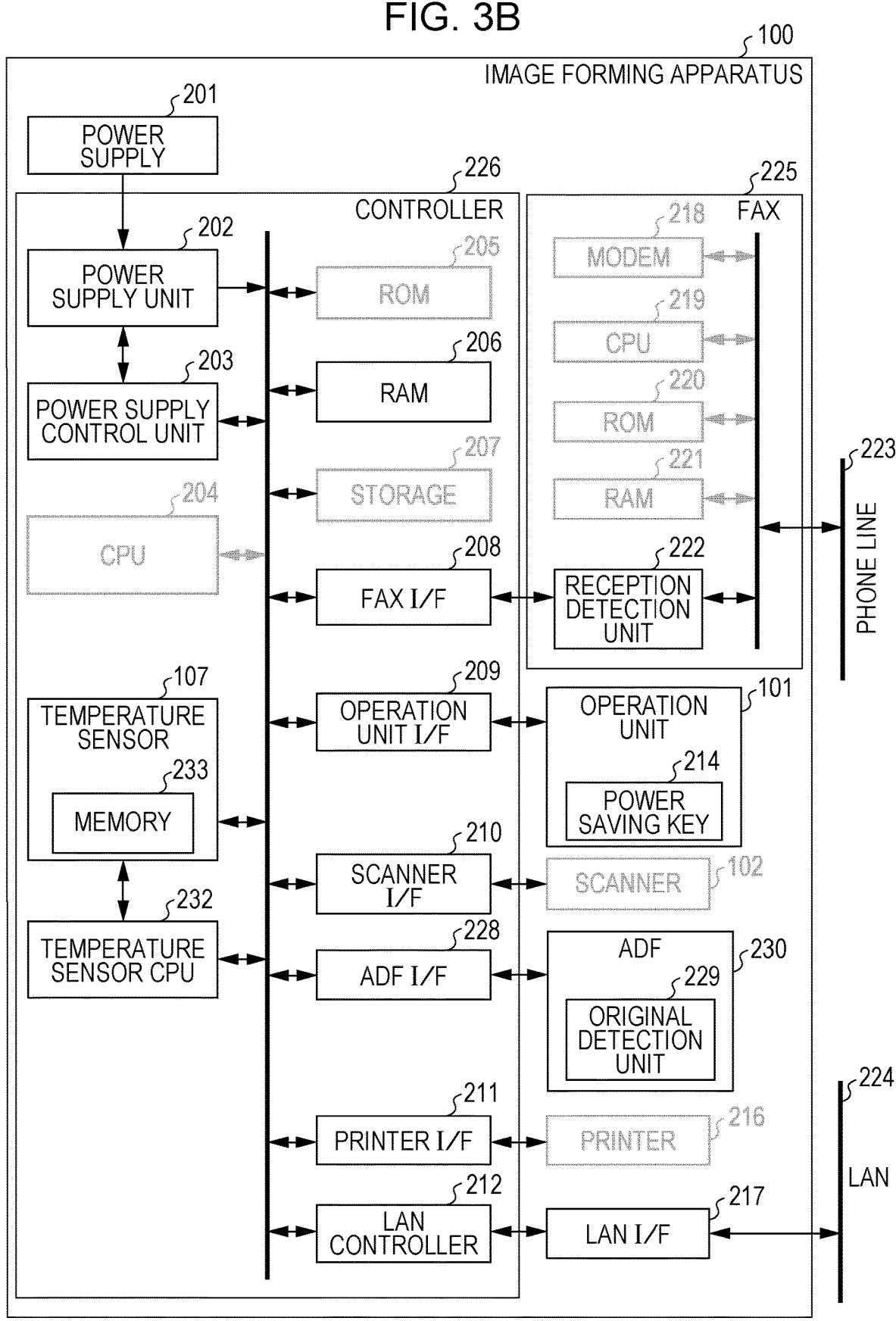

FIGS. 3A and 3B are block diagrams illustrating a hardware configuration of the image forming apparatus 100 illustrated in FIGS. 1A and 1B. FIG. 3A is a block diagram of the image forming apparatus 100 in the standby mode. FIG. 3B is a block diagram of the image forming apparatus 100 in the power saving mode. Components illustrated in gray in FIG. 3B are not supplied with the power.

In FIG. 3A, a controller 226 is connected to a LAN 224 via a LAN controller 212 and a LAN I/F 217. A FAX 225 is connected to a telephone line 223.

A CPU 204 executes a software program for controlling the entire apparatus of the controller 226. A RAM 206 is used for a temporary storage of data or the like when the CPU 204 controls the apparatus. A ROM 205 stores an activation program for the apparatus, various setting values, and the like. A storage 207 is constituted by a hard disc drive (HDD) or a solid-state drive (SSD) and is used for various data storages.

The operation unit 101 is provided with a liquid crystal panel for operations and a hard key including the power saving key 214 and accepts an instruction input from the user. An operation unit I/F 209 is an interface that connects the controller 226 to the operation unit 101. An auto document feeder (ADF) 230 is an apparatus configured to convey originals to a reading unit of the scanner 102 to continuously read the originals by the scanner 102. The ADF 230 is provided with an original detection unit 229 configured to detect that the user places an original. The original detection unit 229 is connected to a power supply control unit 203 via an ADF I/F 228. In the power saving mode, in a case where the original detection unit 229 detects the original, the mode of the image forming apparatus 100 is shifted from the power saving mode to the standby mode.

The CPU 204 performs the control of the ADF 230 via the ADF I/F 228. The scanner 102 reads an image of the original placed on a platen glass or the ADF 230 to generate image data. The CPU 204 performs the control of the scanner 102 via a scanner I/F 210. The printer 216 prints the image based on the generated image data or the read image data on paper (sheet). The CPU 204 performs the control of the printer 216 via a printer I/F 211.

The FAX 225 is constituted by a modem 218, a CPU 219, a RAM 221, a ROM 220, and a reception detection unit 222. The FAX 225 performs a data communication control with an external apparatus via the telephone line 223. The modem 218 performs a modulation for the transmission and reception of the FAX 225. The CPU 219 performs a control on the transmission and reception of the FAX 225 via a FAX I/F 208.

The RAM 221 stores temporal data when the CPU 219 controls the FAX 225. The ROM 220 stores an activation program for the FAX 225, various setting values, and the like. The controller 226 may have the functions of the CPU 219, the RAM 221, and the ROM 220 of the FAX 225. The power supply control unit 203 performs a power control on the image forming apparatus 100. The power supply control unit 203 controls supply and stop of power, which is generated by a power supply unit 202 connected to a power supply 201, to the respective units.

Figure 5A:
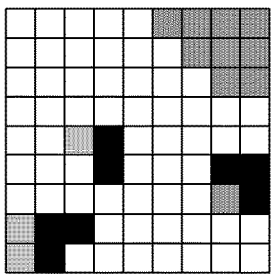
FIGS. 5A to 5C illustrate detection states of the temperature sensor.

The temperature sensor 107 outputs infrared rays and also receives infrared rays obtained when the output infrared rays are reflect by an object. It is possible to measure a temperature of the object on the basis of the received infrared rays. A memory 233 of the temperature sensor 107 holds background temperature data as illustrated in FIG. 5A. This background temperature data is information indicating a surrounding temperature around the image forming apparatus 100. For example, in a case where the fluorescent lamp, the PC, or the like is installed in the surrounding of the image forming apparatus 100, the background temperature data includes temperature information of the fluorescent lamp or the PC. This background temperature data is preferably obtained when a person or the like is not present around the image forming apparatus 100. The background temperature data is regularly updated. A method for this update will be described below.

Figure 5B:
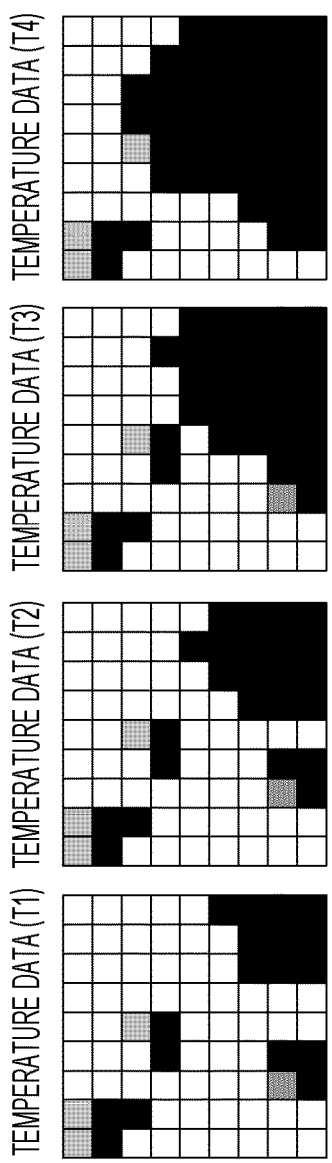

As illustrated in FIG. 5B, the temperature sensor 107 obtains a surrounding temperature of the image forming apparatus 100 at a predetermined time interval to detect the person approaching the image forming apparatus 100. Hereinafter, temperature data obtained at a time T is set as temperature data (T).

A temperature sensor CPU 232 determines whether or not a person exists in the surrounding of the image forming apparatus 100 on the basis of the background temperature data and the temperature data (T). A detail of the above-described determination by the temperature sensor CPU 232 will be described below.

The above-described background temperature data is to be regularly adjusted. This is because the surrounding temperature of the image forming apparatus 100 is regularly changed depending on an opening condition of curtains, a power ON state of the PC, a setting of an air conditioner, and the like. Therefore, if the background temperature data is not regularly updated, the person approaching the image forming apparatus 100 is not to be accurately detected.

The temperature sensor CPU 232 is connected to the power supply control unit 203 and transmits a signal for shifting the mode of the image forming apparatus 100 to the standby mode (a shift instruction signal 504 (see FIG. 4)) to the power supply control unit 203 when it is determined that the person approaching the image forming apparatus 100 exists.

As illustrated in FIG. 3A, the power is supplied to all the blocks in the standby mode. It is noted that, in the standby mode, the power may be supplied only to necessary functions. For example, in a case where a print job for causing the printer 216 to perform printing is received via the LAN 224, the power is supplied to the printer 216, and the power may not be supplied to the scanner 102 and the like which are not used for processing the print job.

As illustrated in FIG. 3B, the power is supplied to a part of the block in the power saving mode. First, the power is supplied to the power supply unit 202 from the power supply 201. The power that has been subjected to the AC/DC conversion by the power supply unit 202 is supplied to the RAM 206, the temperature sensor 107, the FAX I/F 208, the reception detection unit 222, the power saving key 214, the operation unit I/F 209, the LAN controller 212, the LAN I/F 217, the original detection unit 229, and the ADF I/F 228.

Hereinafter, a shifting condition to the standby mode or the power saving mode will be described with reference to FIG. 4.

Figure 4:
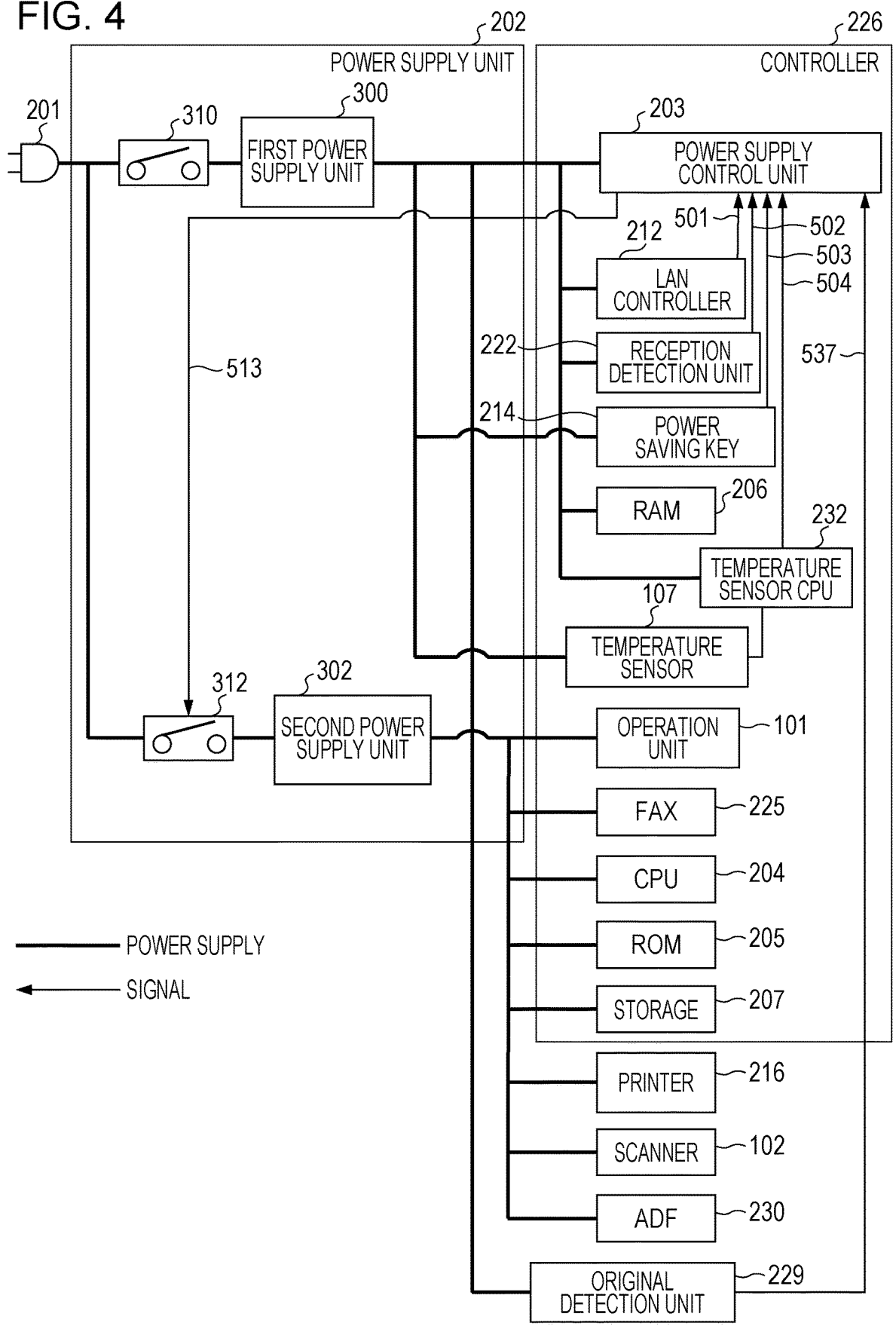
FIG. 4 is a power supply block diagram of the image forming apparatus.

FIG. 4 is a power supply block diagram of the image forming apparatus 100.

In the power saving mode, in a case where the reception detection unit 222 of the FAX 225 detects the FAX reception, a shift instruction signal 502 is transmitted to the power supply control unit 203 via the FAX I/F 208. In response to this, the power supply control unit 203 shifts the mode of the image forming apparatus 100 to the standby mode. Furthermore, in the power saving mode, in a case where the LAN controller 212 receives a job from the LAN I/F 217 such as a print job in which the mode is to be shifted to the standby mode, a shift instruction signal 501 is transmitted to the power supply control unit 203. In response to this, the power supply control unit 203 shifts the mode of the image forming apparatus 100 to the standby mode.

Moreover, in the power saving mode, in a case where the user presses the power saving key 214, the power saving key 214 transmits a shift instruction signal 503 to the power supply control unit 203 via the operation unit I/F 209. In response to this, the power supply control unit 203 shifts the mode of the image forming apparatus 100 to the standby mode. Although only the power saving key 214 is illustrated in the operation unit 101, a configuration in which, when a touch by the user on a touch panel is recognized, the shift instruction signal 503 is transmitted to the power supply control unit 203 may also be adopted.

In addition, according to the present exemplary embodiment, in the power saving mode, in a case where the temperature sensor CPU 232 determines that the person approaching the image forming apparatus 100 exists, the temperature sensor CPU 232 transmits the shift instruction signal 504 to the power supply control unit 203. In response to this, the power supply control unit 203 shifts the mode of the image forming apparatus 100 to the standby mode.

Next, a detail of the power supply unit 202 will be described with reference to FIG. 4. The power input from the power supply (plug) 201 is supplied to a first power supply unit 300 via an SW 310. In addition, the power input from the power supply (plug) 201 is supplied to a second power supply unit 302 via an SW 312. The SW 310 is a seesaw SW or a button SW that can be manually turned ON by the user.

Herein, in a case where the SW 310 is turned ON, the power supply control unit 203 transmits an ON-command signal 513 to the SW 312. In response to this, the mode of the image forming apparatus 100 is shifted to the standby mode. The first power supply unit 300 supplied with the power when the SW 310 is turned ON supplies the power to the block that operates in the power saving mode. The second power supply unit 302 supplies the power to the block that operates in the standby mode.

The first power supply unit 300 generates, for example, a direct-current voltage at 5.0 V. Meanwhile, the second power supply unit 302 generates, for example, a direct-current voltage at 24.0 V.

Next, a case where the power supply control unit 203 receives the shifting instruction to the standby mode (the shift instruction signal 501, 502, 503, 504, or 537) will be described.

In a case where at least one of the shifting instruction signals indicating that the mode is to be shifted to the standby mode is received, the power supply control unit 203 transmits the ON-command signal 513 to the SW 312. In response to this, the power is supplied to the second power supply unit 302 from the power supply 201. The second power supply unit 302 then supplies the generated direct-current power supply to the operation unit 101, the printer 216, the scanner 102, and the like. As a result, the mode of the image forming apparatus 100 is shifted from the power saving mode to the standby mode. In the standby mode, the power is supplied to the component where the power is not supplied in the power saving mode.

Figure 5C:
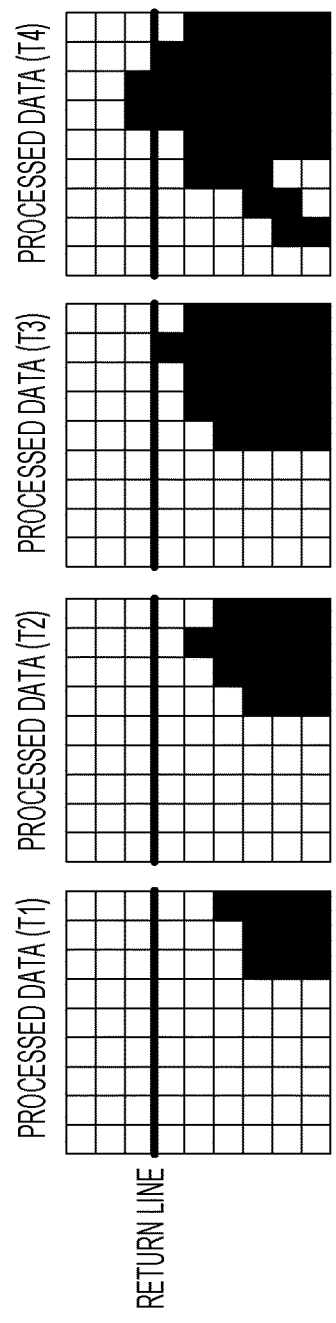

FIGS. 5A to 5C illustrate a detection state of the temperature sensor.

FIG. 5A illustrates the background temperature data. The background temperature data indicates a temperature state in a surrounding of the image forming apparatus 100. Parts illustrated in gray or black in the background temperature data illustrated in FIG. 5A indicate, for example, heat sources such as the fluorescent lamp and the PC. This background temperature data is preferably obtained at a timing at which a person is not present around the image forming apparatus 100. For example, the temperature data obtained at a timing at which the operation unit 101 of the image forming apparatus 100 is not performed for a predetermined period of time can be set as the background temperature data. It is noted that the elements illustrated in white detect, for example, a temperature below 30° C., the elements illustrated in gray detect, for example, a temperature between 30° C. and 34° C., and the elements illustrated in black detect, for example, a temperature higher than or equal to 35° C.

FIG. 5B illustrates temperature data obtained at a predetermined time interval (for example, at a 0.2-second interval). This temperature data is obtained at a predetermined time interval while the image forming apparatus 100 is in the power saving mode. The temperature sensor CPU 232 obtains the temperature data from the temperature sensor 107 at a predetermined time interval such as T1, T2, T3, T4, . . . .

With reference to FIG. 5B, the number of elements that detect the heat sources having a temperature higher than or equal to a predetermined temperature is increased along the elapse of time. In a case where a person approaches the image forming apparatus 100, the number of elements that detect the temperature higher than or equal to the predetermined temperature is increased as illustrated in FIG. 5B.

FIG. 5C illustrates processed data calculated from the background temperature data and the temperature data. The processed data is created from a difference between the background temperature data and the temperature data. Herein, the processed data is created from the difference between the background temperature data and the temperature data, but a method of creating the processed data is not limited as long as the processed data is generated by performing a calibration with respect to the temperature data by using the background temperature data. Filtering processing may also be performed to remove noise from the respective temperature data and the respective processed data.

The processed data indicates a heat source other than the heat source indicated by the background temperature data. The temperature sensor CPU 232 determines whether or not a person approaches the image forming apparatus 100 on the basis of these pieces of processed data (T).

According to the present exemplary embodiment, the temperature sensor CPU 232 determines that the person approaches the image forming apparatus 100 in a case where the element of the temperature sensor 107 which exceeds a return line illustrated in FIG. 5C detects the heat source. In response to this, the mode of the image forming apparatus 100 is shifted from the power saving mode to the standby mode.

With regard to the processed data (T4), since the element of the temperature sensor 107 which exceeds the return line detects the heat source, the mode of the image forming apparatus 100 is returned to the standby mode at a time T4. While it is determined that the person approaches the image forming apparatus 100 in a case where the element that exceeds the return line detects the heat source, this setting is not seen to be limiting. For example, it may be determined that the person approaches the image forming apparatus 100 in a case where an increased amount of the elements that detect a temperature higher than a predetermined temperature during a predetermined period of time exceeds a predetermined value.

Figure 6:
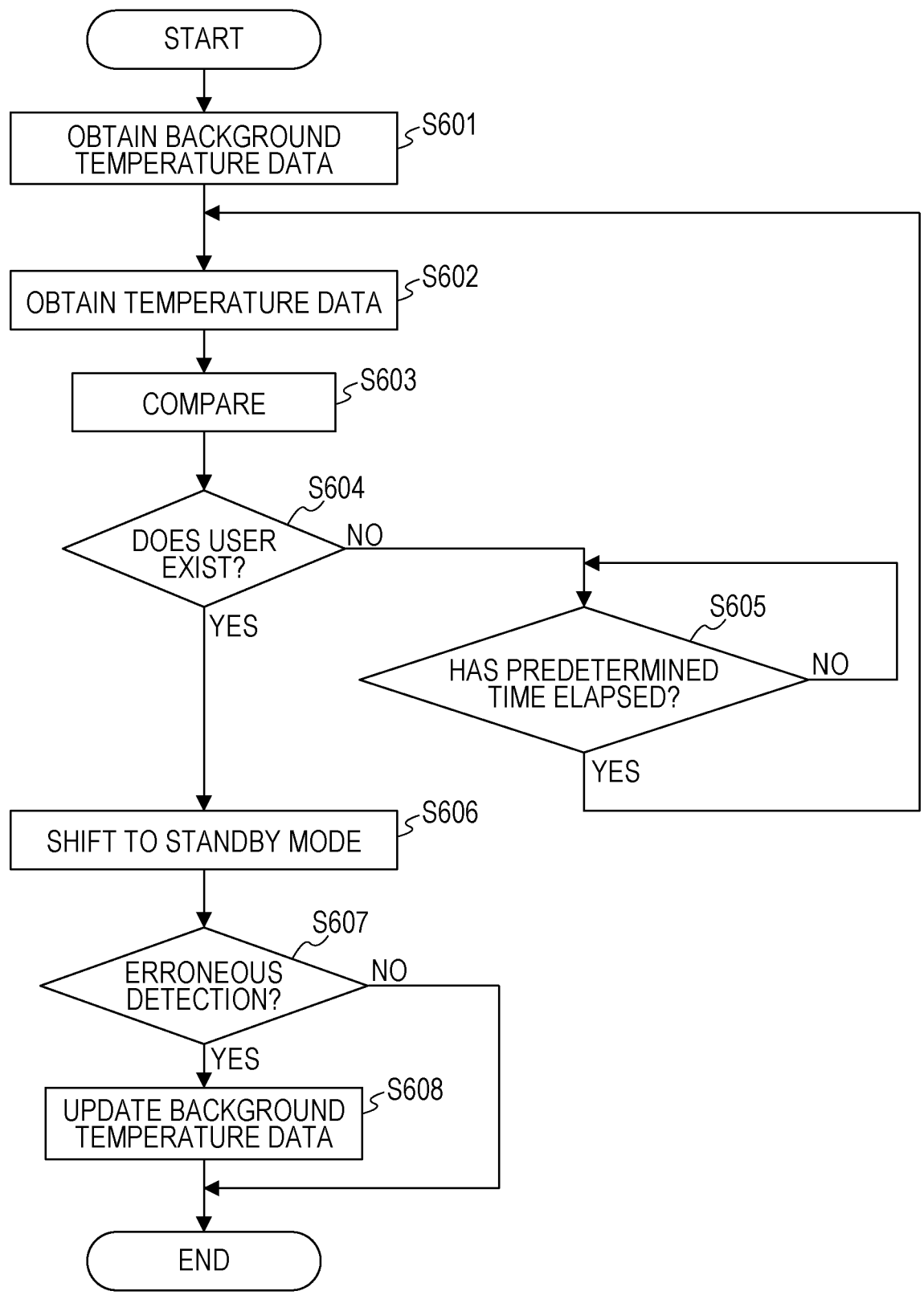
FIG. 6 is a flow chart for updating background temperature data.

FIG. 6 is a flow chart for updating the background temperature data. The respective steps are realized while the temperature sensor CPU 232 executes the program. When the mode of the image forming apparatus 100 is shifted to the power saving mode, the temperature sensor CPU 232 operates as follows.

First, the temperature sensor CPU 232 obtains the background temperature data (S601).

Subsequently, the temperature sensor CPU 232 obtains the temperature data (T1) (S602).

The temperature sensor CPU 232 compares the background temperature data with the temperature data (T1) (S603). Specifically, the temperature sensor CPU 232 calculates a difference between the background temperature data and the temperature data (T1). As a result of this calculation, the processed data (T1) is obtained.

The temperature sensor CPU 232 determines whether or not a user of the image forming apparatus 100 exists on the basis of the processed data (T1) (S604). When it is determined that the user does not exist (S604: No), after a predetermined time has elapsed (for example, 0.2 seconds) (S605), the temperature data (T2) is obtained again (S602). In this manner, while the power saving mode is set, the temperature sensor CPU 232 obtains the temperature data at a predetermined interval.

After the temperature data is repeatedly obtained again, in a case where the temperature sensor CPU 232 determines that the person approaching the image forming apparatus 100 exists as indicated by the processed data (T4) illustrated in FIG. 5C, the mode of the image forming apparatus 100 is shifted to the standby mode (S606). Specifically, the temperature sensor CPU 232 transmits the shift instruction signal 504 to the power supply control unit 203 when it is determined that the person approaching the image forming apparatus 100 exists. The power supply control unit 203 that has received the shift instruction signal 504 turns the SW 312 ON to shift the mode of the image forming apparatus 100 to the standby mode.

However, the temperature sensor CPU 232 may perform an erroneous detection in some cases. When the image forming apparatus 100 is in the power saving mode, in a case where the curtains are opened, the power supply of the personal computer is turned ON, or the fluorescent lamp is turned ON, a heat source that is not indicated by the background temperature data is generated. In this case, the temperature sensor CPU 232 may erroneously detect that the generated heat source is the person approaching the image forming apparatus 100.

In view of the above, according to the present exemplary embodiment, in a case where the shift to the standby mode caused by the temperature sensor CPU 232 is based on the erroneous detection (S607: Yes), the background temperature data is updated.

With regard to the determination as to whether or not the detection is the erroneous detection, even though the mode of the image forming apparatus 100 is shifted to the standby mode, in a case where the operation unit 101 is not operated after a predetermined time has elapsed since the shift to the standby mode, it is determined that the detection is the erroneous detection.

As illustrated in FIG. 5C, in a case where the mode is returned to the standby mode at the time T4, but this return is not the return based on the approach by the person, the temperature data (T4) is updated to the background temperature data (S608).

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-075110 filed Apr. 1, 2014, which is hereby incorporated by reference herein in its entirety.

What is claimed is:
1. An image forming apparatus comprising:
an operation unit which receives a user operation;
a human sensor which includes a plurality of elements which respectively output plural pieces of data corresponding to a temperature; and
a controller which stores a background temperature data including the plural pieces of data output from the human sensor in a storage on a condition that a predetermined time has elapsed without receiving a user operation by the operation unit,
stores plural pieces of temperature distribution data to be compared with the background temperature data and including the plural pieces of data output from the human sensor at a predetermined interval in a first power state after the background temperature data is stored in the storage, and shifts a power state of the image forming apparatus from the first power state to a second power state in which power consumption is higher than power consumption in the first power state based on a result of comparison between each of the plural pieces of temperature distribution data and the background temperature data.

2. The image forming apparatus according to claim 1, wherein the human sensor is an infrared array sensor which has a plurality of elements that receive infrared rays.

3. The image forming apparatus according to claim 1, wherein the human sensor is an active type sensor that outputs infrared rays and receives the infrared rays reflected by a human.

4. The image forming apparatus according to claim 1, wherein the human sensor is a passive type sensor that receives infrared rays output from a human.

5. The image forming apparatus according to claim 1, wherein the controller regularly adjusts the background temperature data stored in the storage.

6. The image forming apparatus according to claim 1, further comprising:
a printer device which forms an image on a sheet.

7. The image forming apparatus according to claim 1, wherein the human sensor outputs the temperature distribution data at the predetermined interval while the image forming apparatus is in the first power state.

8. The image forming apparatus according to claim 1, wherein the controller specifies a position of a heat source based on the result of the comparison, and shifts the state of the image forming apparatus from the first power state to the second power state based on the position of the heat source being within a predetermined detection range of the human sensor.

9. The image forming apparatus according to claim 1, wherein the operation unit is a touch panel.

10. The image forming apparatus according to claim 1, wherein after the power state of the image forming apparatus is shifted from the first power state to the second power state, the controller stores a new background temperature data including t plural pieces of data output from the human sensor in the storage on a condition that the predetermined time has elapsed without receiving the user operation by the operation unit in the second power state.

11. A control method for an image forming apparatus that includes an operation unit which receives a user operation, the control method comprising:

storing a background temperature data including plural pieces of data output from a human sensor in a storage on a condition that a predetermined time has elapsed without receiving a user operation by the operation unit, the human sensor including a plurality of elements which respectively output the plural pieces of data corresponding to a temperature;

storing plural pieces of temperature distribution data to be compared with the background temperature data and including the plural pieces of data output from the human sensor at a predetermined interval in a first power state after the background temperature data is stored in the storage; and shifting a power state of the image forming apparatus from the first power state to a second power state in which power consumption is higher than power consumption in the first power state based on a result of comparison between each of the plural pieces of temperature distribution data and the stored background temperature data.

12. A non-transitory computer-readable storage medium storing instructions that, when executed by a computer of an image forming apparatus that includes an operation unit which receives a user operation, cause the computer to perform a method comprising:

storing a background temperature data including plural pieces of data output from a human sensor in a storage on a condition that a predetermined time has elapsed without receiving a user operation by the operation unit, the human sensor including a plurality of elements which respectively output the plural pieces of data corresponding to a temperature;

storing plural pieces of temperature distribution data to be compared with the background temperature data and including the plural pieces of data output from the human sensor at a predetermined interval in a first power state after the background temperature data is stored in the storage; and shifting a power state of the image forming apparatus from the first power state to a second power state in which power consumption is higher than power consumption in the first power state based on a result of comparison between each of the plural pieces of temperature distribution data and the stored background temperature data.

* * * * *